United States Patent
Coleman et al.

(10) Patent No.: US 10,466,543 B2
(45) Date of Patent: Nov. 5, 2019

(54) PIXEL GEOMETRIES FOR SPATIALLY MULTIPLEXED STEREO 3D DISPLAYS

(71) Applicant: RealD Inc., Beverly Hills, CA (US)

(72) Inventors: David A. Coleman, Louisville, CO (US); Peter Ludé, San Francisco, CA (US)

(73) Assignee: RealD, Inc., Beverly Hills, CA (US)

( * ) Notice: Subject to any disclaimer, the term of this patent is extended or adjusted under 35 U.S.C. 154(b) by 58 days.

(21) Appl. No.: 15/633,493

(22) Filed: Jun. 26, 2017

(65) Prior Publication Data

US 2017/0371192 A1 Dec. 28, 2017

Related U.S. Application Data

(60) Provisional application No. 62/355,266, filed on Jun. 27, 2016.

(51) Int. Cl.
| | |
|---|---|
| G02F 1/13363 | (2006.01) |
| H04N 13/337 | (2018.01) |
| H04N 13/339 | (2018.01) |
| H04N 13/218 | (2018.01) |
| G02B 27/26 | (2006.01) |
| G02B 27/22 | (2018.01) |

(52) U.S. Cl.
CPC ..... *G02F 1/13363* (2013.01); *G02B 27/2214* (2013.01); *G02B 27/26* (2013.01); *H04N 13/218* (2018.05); *H04N 13/337* (2018.05); *H04N 13/339* (2018.05); *G02F 2001/133638* (2013.01)

(58) Field of Classification Search
None
See application file for complete search history.

(56) References Cited

U.S. PATENT DOCUMENTS

2010/0118045 A1* 5/2010 Brown Elliott .... G02B 27/2214
345/589

FOREIGN PATENT DOCUMENTS

| EP | 2699009 A | 2/2014 |
|---|---|---|
| KR | 10-2012-0026786 A | 3/2012 |
| KR | 10-2012-0070221 A | 6/2012 |
| KR | 10-2012-0097381 A | 9/2012 |
| KR | 10-2012-0139221 A | 12/2012 |

OTHER PUBLICATIONS

International search report and written opinion in PCT Application No. PCT/US2017/039311, dated Oct. 13, 2017.

* cited by examiner

*Primary Examiner* — Ifedayo B Iluyomade
(74) *Attorney, Agent, or Firm* — Penny L. Lowry; Neil G. J. Mothew

(57) ABSTRACT

A 3D image pixel in a spatially multiplexed stereo 3D display includes a first left-eye subpixel and a second left-eye subpixel that are both driven when displaying the left-eye image. The 3D image pixel also includes a first right-eye subpixel and a second right-eye subpixel that are both driven when displaying the right-eye image. The subpixels may all have a square shape. Single color emitters in the subpixels of the same eye may be driven by the same electronics. A 3D image pixel in a second spatially multiplexed stereo 3D display includes a left-eye pixel driven when displaying the left-eye image and a right-eye pixel driven when displaying the right-eye image. The pixels may all have a rectangular shape, and the horizontal measurement of the pixels may be greater than the vertical measurement of the pixels.

16 Claims, 12 Drawing Sheets

PIXEL GEOMETRIES FOR SPATIALLY MULTIPLEXED STEREO 3D DISPLAYS

TECHNICAL FIELD

This disclosure relates generally to cinema display technology, and more particularly to pixel geometries for spatially multiplexed stereo 3D (SMS3D) displays.

BACKGROUND

In the display of stereoscopic 3D image content, separate images must be presented to the right and left eyes. This can be achieved by either (1) angularly directing light from the display separately to each of the two eyes (autostereoscopic), or (2) encoding the light (in time, color, or polarization) and then decoding the light using eyewear worn by the viewer. When encoding the light, individual pixels may be separately encoded for either the left eye or the right eye to create SMS3D displays.

BRIEF SUMMARY

Disclosed herein are embodiments of a 3D image pixel in a spatially multiplexed stereo 3D display for displaying a 3D image that includes a left-eye image and a right-eye image. The 3D image pixel may include a first left-eye subpixel and a second left-eye subpixel that are both driven when displaying the left-eye image. The 3D image pixel may also include a first right-eye subpixel and a second right-eye subpixel that are both driven when displaying the right-eye image. The first right-eye subpixel may be adjacent to both the first left-eye subpixel and the second left-eye subpixel. The second right-eye subpixel may be adjacent to both the first left-eye subpixel and second left-eye subpixel. The first right-eye subpixel may be horizontally adjacent to the first left-eye subpixel and may be vertically adjacent to the second left-eye subpixel. In some embodiments, all of the subpixels have a square shape. In some embodiments, the first left-eye subpixel and the first right-eye subpixel emit only green color, while the second left-eye subpixel and the second right-eye subpixel emit only red and blue colors. In some embodiments, the first left-eye subpixel and the second right-eye subpixel emit only green and red colors, while the second left-eye subpixel and the first right-eye subpixel emit only green and blue colors. In some embodiments, green emitters in the first and second subpixels of the same eye are driven by the same electronics.

Also disclosed herein are embodiments of a 3D image pixel in a spatially multiplexed stereo 3D display for displaying a 3D image that includes a left-eye image and a right-eye image. The 3D image pixel may include a left-eye pixel driven when displaying the left-eye image. The 3D image pixel may also include a right-eye pixel driven when displaying the right-eye image. The right-eye pixel may be adjacent to the left-eye pixel, and may be either horizontally adjacent or vertically adjacent. In some embodiments, all of the pixels have a rectangular shape. In some embodiments, the horizontal measurement of the pixels is greater than the vertical measurement of the pixels.

Also disclosed herein are embodiments of a spatially multiplexed stereo 3D display that includes a plurality of 3D image pixels as described herein. A first 3D image pixel may be horizontally adjacent to a second 3D image pixel and may be vertically adjacent to a third 3D image pixel. The right-eye pixel of the first 3D image pixel may be vertically adjacent to and below the left-eye pixel of the first 3D image pixel. The right-eye pixel of the second 3D image pixel may be vertically adjacent to and above the left-eye pixel of the second 3D image pixel. The right-eye pixel of the third 3D image pixel may be vertically adjacent to and below the left-eye pixel of the third 3D image pixel.

Also disclosed herein are embodiments of a 3D image pixel in a spatially multiplexed stereo 3D display for displaying a 3D image that includes a left-eye image and a right-eye image. The 3D image pixel may include a first left-eye subpixel, a second left-eye subpixel, and a third left-eye subpixel that are all driven when displaying the left-eye image. The 3D image pixel may also include a first right-eye subpixel, a second right-eye subpixel, and a third right-eye subpixel that are all driven when displaying the right-eye image. In some embodiments, the first left-eye and first right-eye subpixels may emit red, blue, and green colors, while the second left-eye and second right-eye subpixels may emit only red and green colors and the third left-eye and third right-eye subpixels may emit only blue and green colors. In some embodiments, green emitters in the first, second, and third subpixels of the same eye are driven by the same electronics.

BRIEF DESCRIPTION OF THE DRAWINGS

Embodiments are illustrated by way of example in the accompanying figures, in which like reference numbers indicate similar parts, and in which.

DETAILED DESCRIPTION

As the quality of home theater and the availability and popularity of streaming and live content increase, cinema must provide an enhanced experience in order to remain competitive. High dynamic range, increased brightness, color gamut, object based sound, and improved stereo 3D can all contribute to this enhanced experience. Projector manufacturers have been improving the performance of their products, but projectors are ultimately limited in both brightness and dynamic range. Therefore there is a need for a new cinema display technology.

In the display of stereoscopic 3D image content, separate images must be presented to the right and left eyes. This may be achieved by either angularly directing light from the display separately to each of the two eyes (autostereoscopic), or by encoding the light (in time, color, or polarization) and then de-coding the light using eyewear worn by the viewer. Currently and for the near future, the highest image quality may be achieved using some sort of eyewear-based system.

For eyewear-based systems, there are at least two general ways of encoding the light. The first and most common method is to encode the images interleaved in time by synchronizing an optical switch with the display. In this method, the active component of the switch can be on the eyewear (active eyewear such as the ExpanD™) or at the projector/display (polarization-based switches such as the RealD Z-Screen™-based technologies or color-based encoding such as the Infitec™ system). A second and related method is to encode the two sets of images using separate projectors. Both of these methods result in full spatial resolution of the displayed images. By contrast, a third method is available in which individual pixels are separately encoded for either the right or left eye. In general this final method may be accomplished by encoding stripes of pixels with differing polarization. This may be accomplished by placing a patterned retarder (Film Patterned Retarder (FPR)) over the display, usually a liquid crystal display (LCD). This third method can be described as a spatially multiplexed display and is the subject of this disclosure. Spatially multiplexed displays have challenges in cinema for a number of reasons to be addressed below.

It should be noted that whereas historically the spatially multiplexed method of displaying stereo 3D has been implemented using polarization, color encoding is also possible. For wide wavelength band pixels, the individual pixels can be filtered to the appropriate color band to encode for 3D. Alternatively, narrower band light sources can be chosen for direct emission.

Figure 1:
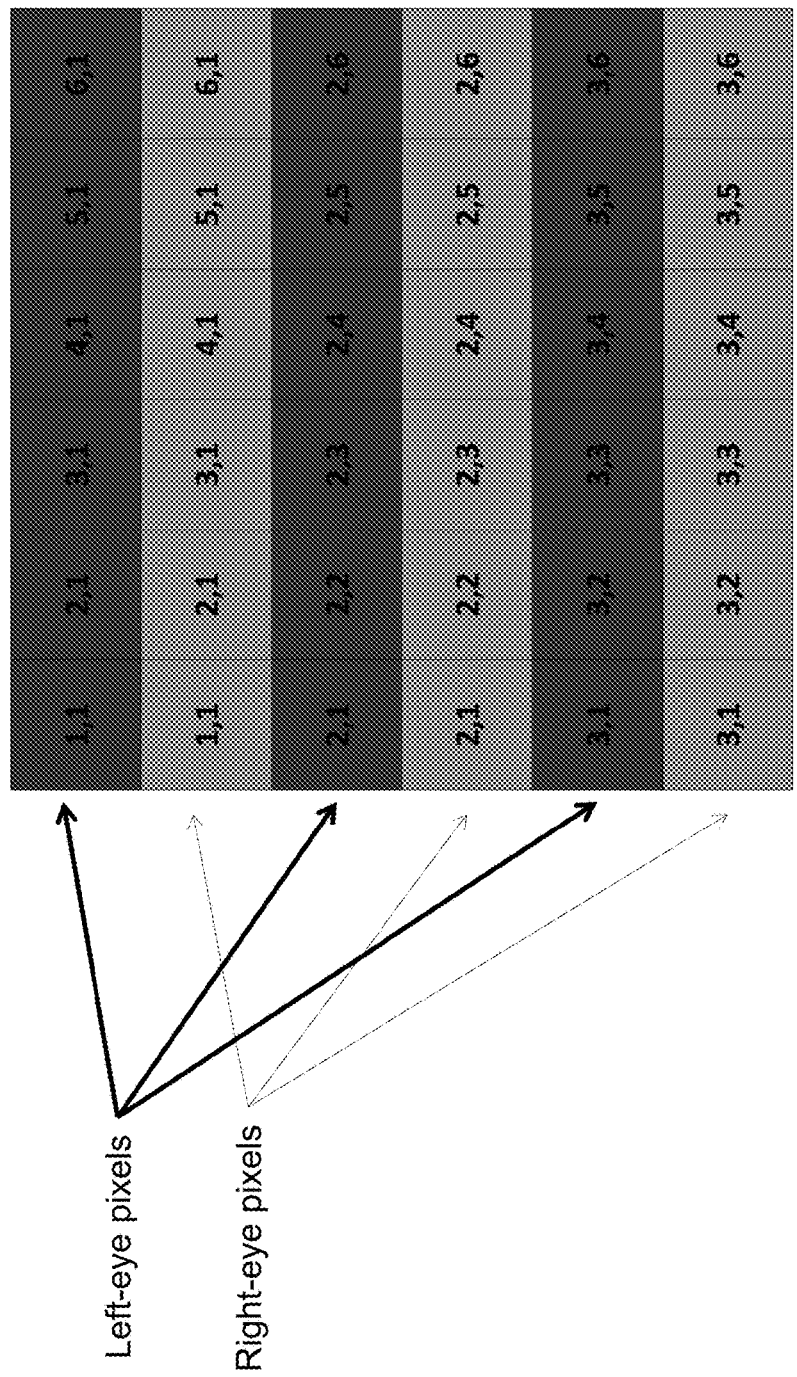
FIG. 1 is a schematic diagram illustrating an example striped Film Patterned Retarder (FPR) display.
Figure 2:
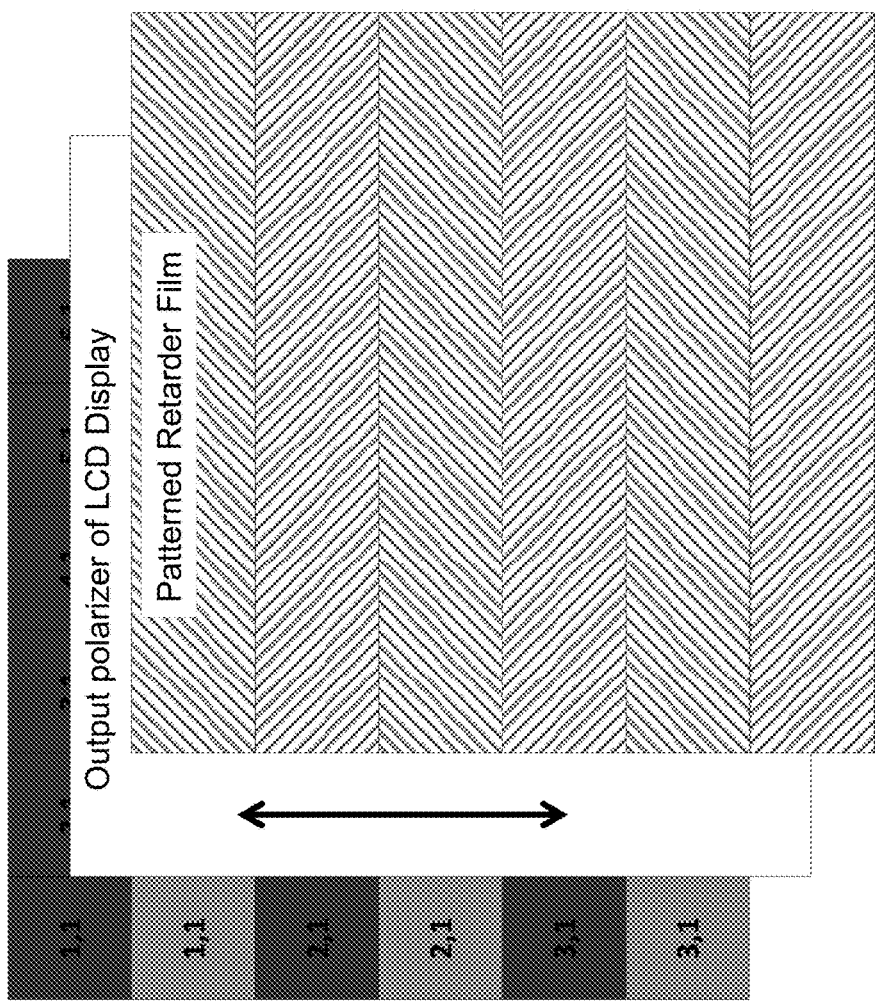
FIG. 2 is a schematic diagram illustrating an example construction of a striped FPR display.

In a SMS3D display, half of the pixels are assigned to address the right eye and half of the pixels are assigned to address the left eye. For LCD SMS3D displays, this has historically been done using horizontal stripes as shown in FIG. 1. An LCD display necessarily has a linear polarizer as its final polarization-control optic. It may be therefore convenient to add a quarter-wave retarder to convert the linear polarization to circular polarization. Typically the retarder may be patterned into horizontal stripes in which the optic axis of the retarder is oriented at either +45° or −45° to the vertical direction as shown in FIG. 2. The stripes may have the same pitch as the pixels and may be overlaid over the pixels so that every other row of pixels is encoded to either right circular or left circular polarization. The stereo image pairs are interleaved so that right eye images are displayed in the even numbered rows and left eye images are displayed in the odd numbered rows (or vice versa). If the viewer wears eyewear with a left circular polarizer covering the left eye and a right circular polarizer covering the right eye, then each eye sees the appropriate imagery. The choice of left vs. right circular polarization for each eye is entirely arbitrary, i.e., the left eye can just as easily use the right circular polarizer. However, in practice, the choice of polarization is generally determined to match that of the readily available eyewear. For convenience, this disclosure assumes that the left lens of the decoding eyewear has a left circular polarizer. Additionally, the exact orientation of the retarder film on the display (+45° or −45°) depends upon whether the polarizer on the LCD is oriented with its absorption axis horizontal or vertical.

Figure 3:
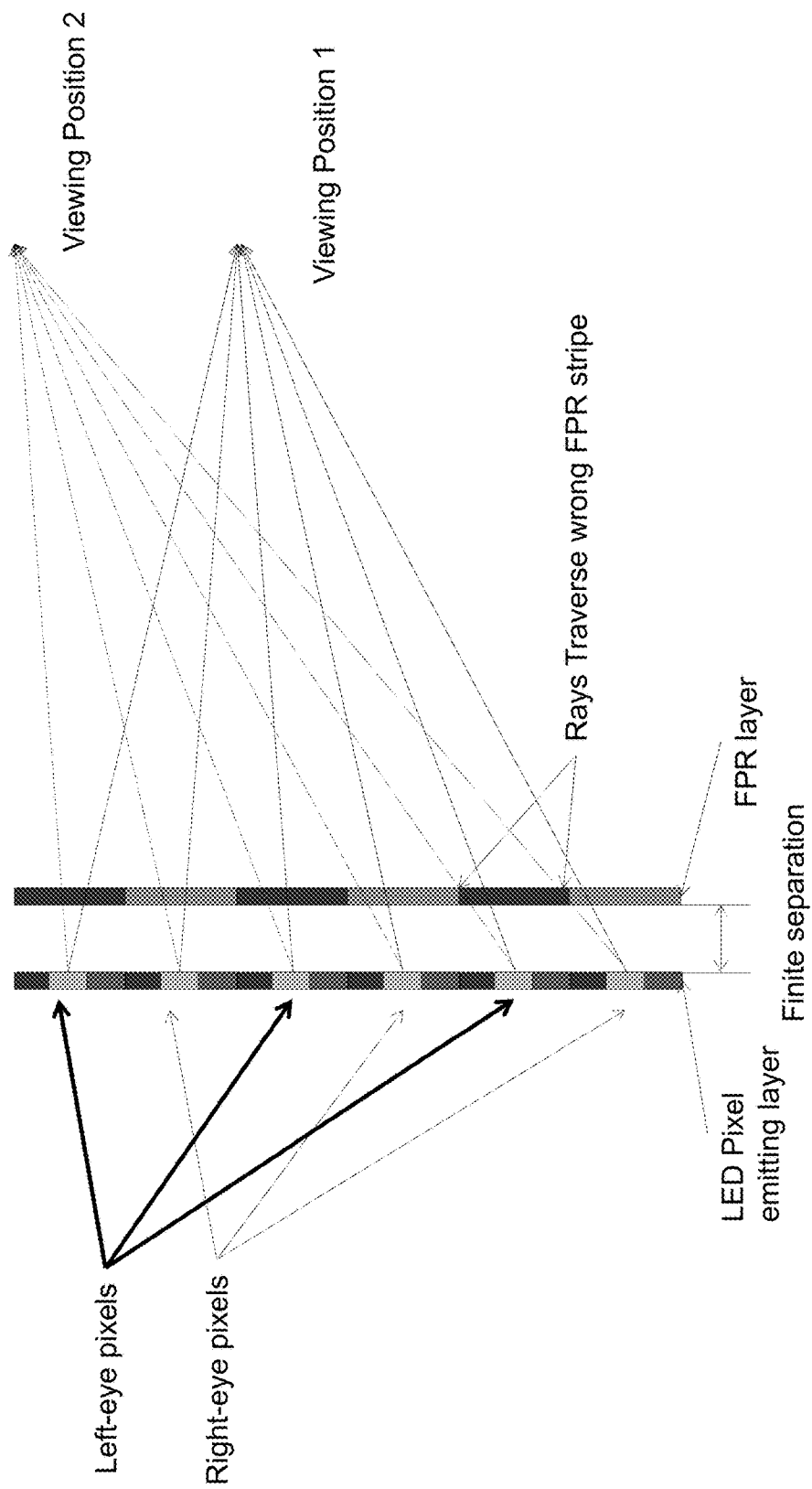
FIG. 3 is a schematic diagram illustrating a side view with parallax of an example striped FPR display.
Figure 4:
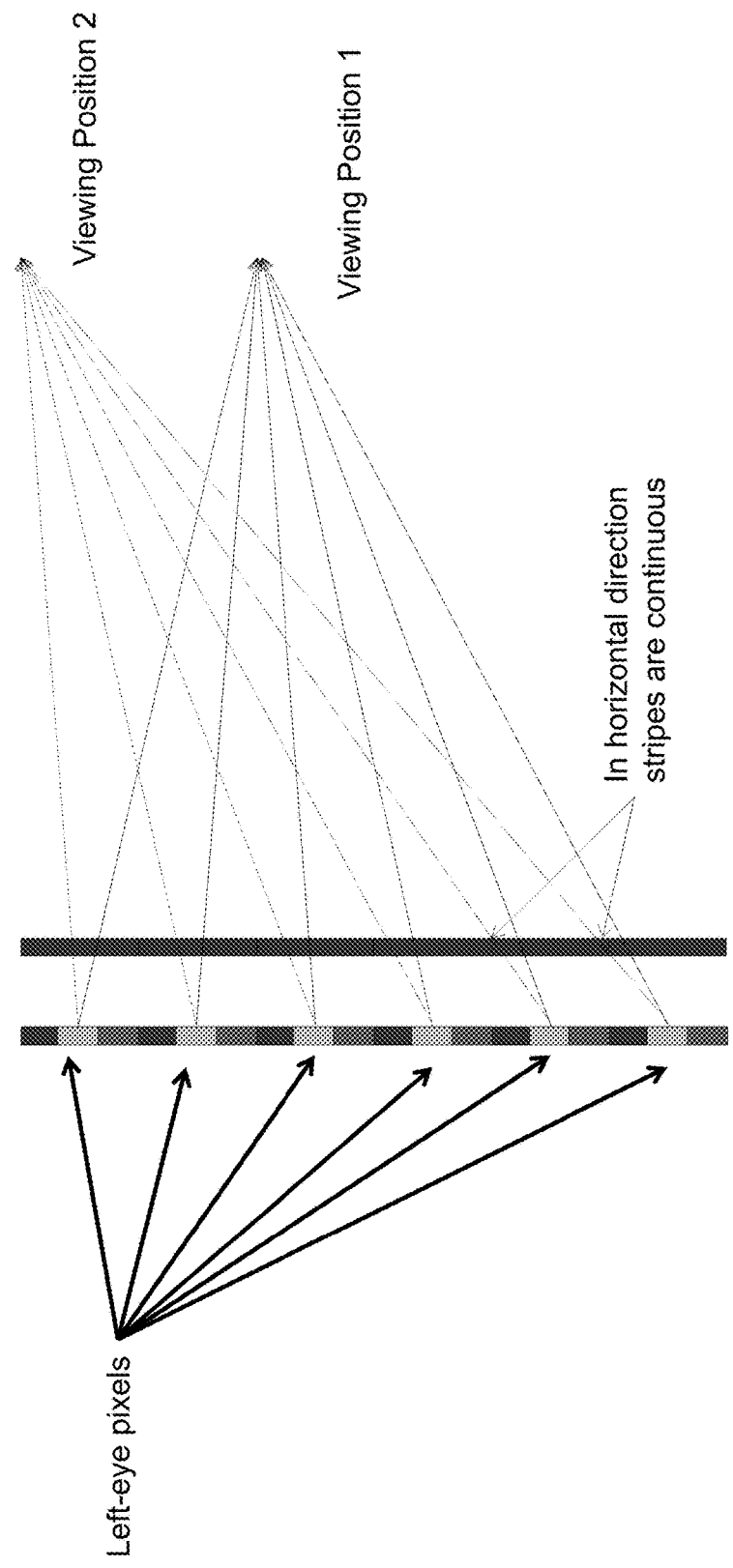
FIG. 4 is a schematic diagram illustrating a top view with parallax of an example striped FPR display.

Horizontal stripes are chosen for LCD FPR displays mainly for viewing angle reasons. As shown in FIG. 3, there is a finite distance between the emitting pixel and the FPR film. If light from left-eye pixels travels through the right-eye retarder as it leaves the display, it will enter the right eye and contribute to stereo cross-talk (ghosting). In typical home viewing environments, the viewers are situated in a relatively small range of vertical angles relative to the screen but spread over a relatively large range of angles in the horizontal direction. Because of this, row geometries may be advantageous. In the vertical direction, where the viewing angles are relatively confined, there may be little chance of light passing through the wrong retarder stripe. In the horizontal direction illustrated in FIG. 4, where there are much larger viewing angles, the stripe is continuous and so the light cannot pass through the wrong retarder stripe.

Figure 5:
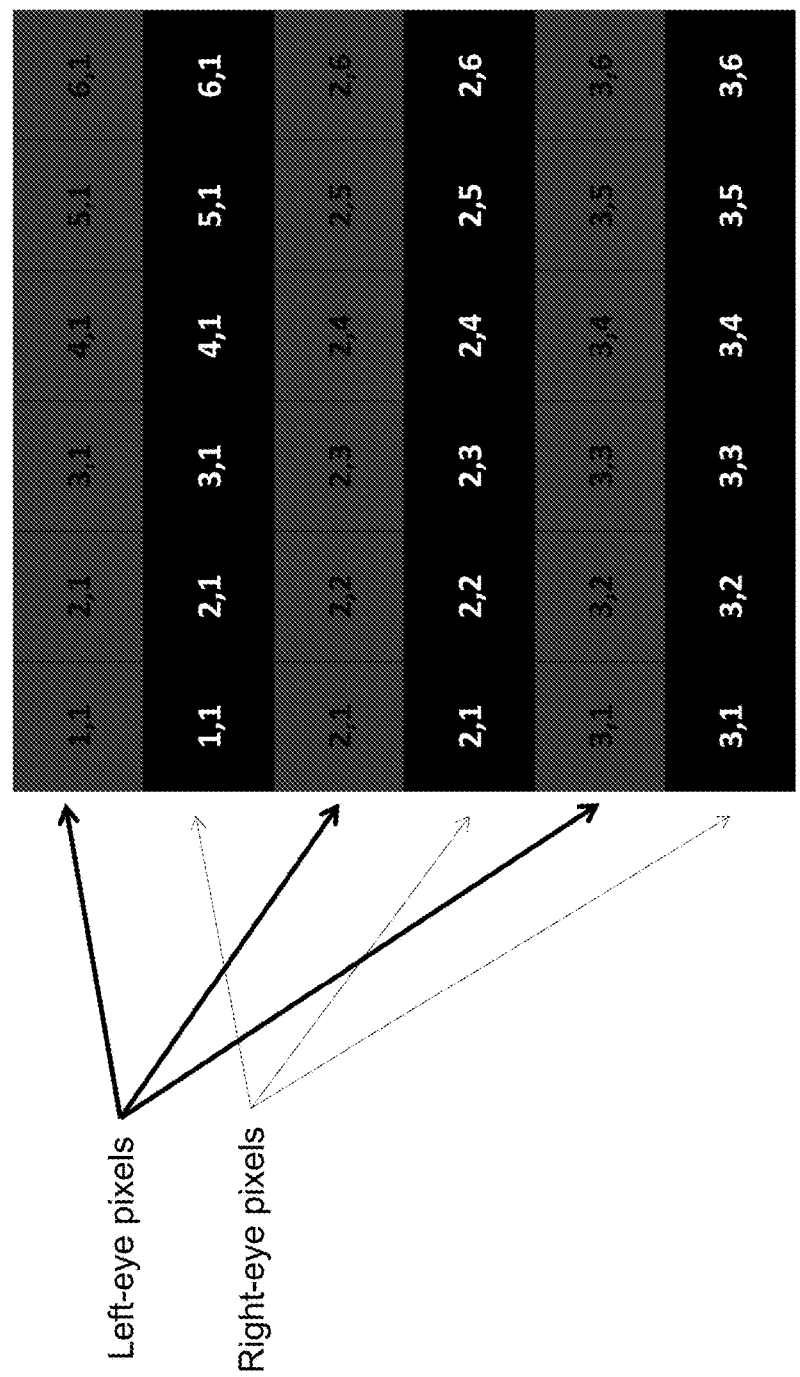
FIG. 5 is a schematic diagram illustrating a view from one eye of an example striped FPR display.

For any pixelated display, it may be important to minimize the impact of the individual pixels on the perceived image. Whereas it may be important to have pixels small enough so that the human eye cannot discern the spacing between, this may not be practical in a cinema environment for all seats. The problem may be compounded for an SMS3D display in which half of the pixels are turned off in 3D mode as illustrated in FIG. 5. Because of the large contrast between the brightness of the fully "on" pixels that are directed at a given eye and the (nearly) fully dark pixels directed at the other eye, the human eye may be extremely sensitive to this artifact. Furthermore, the human eye is exceptionally well attuned to seeing lines so that continuous dark lines superimposed over the image can be extremely distracting. For LCD FPR displays, the viewers are typically seated far enough back that for most content, the black stripes are not resolvable. However, in a cinema environment, many viewers may be seated as close or closer than one screen height of the screen. In this case, even at 4 k resolution per eye, the dark stripes may be resolvable for many viewers.

Figure 6:
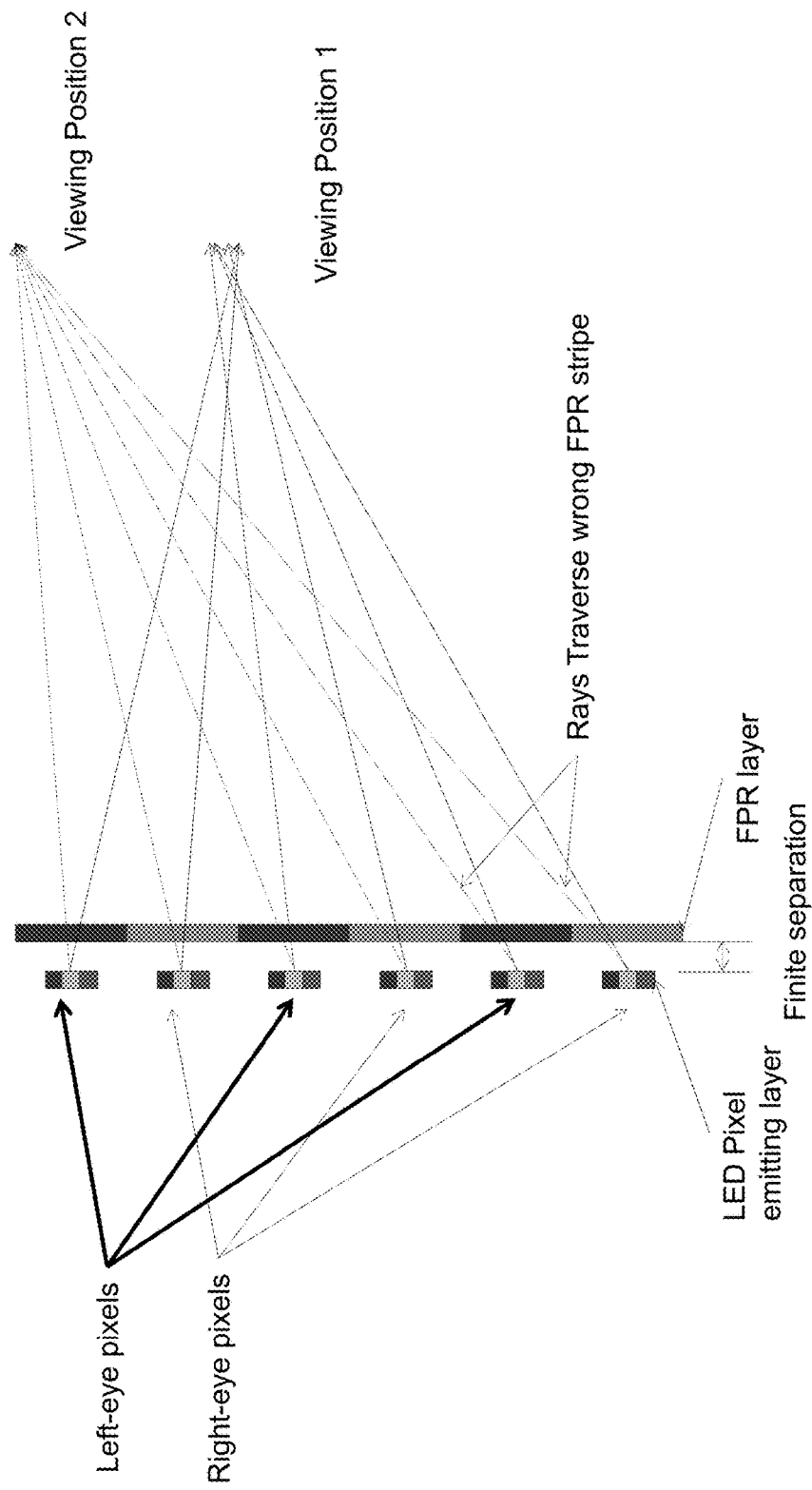
FIG. 6 is a schematic diagram illustrating a side view with parallax of an example checkerboard FPR display.
Figure 7:
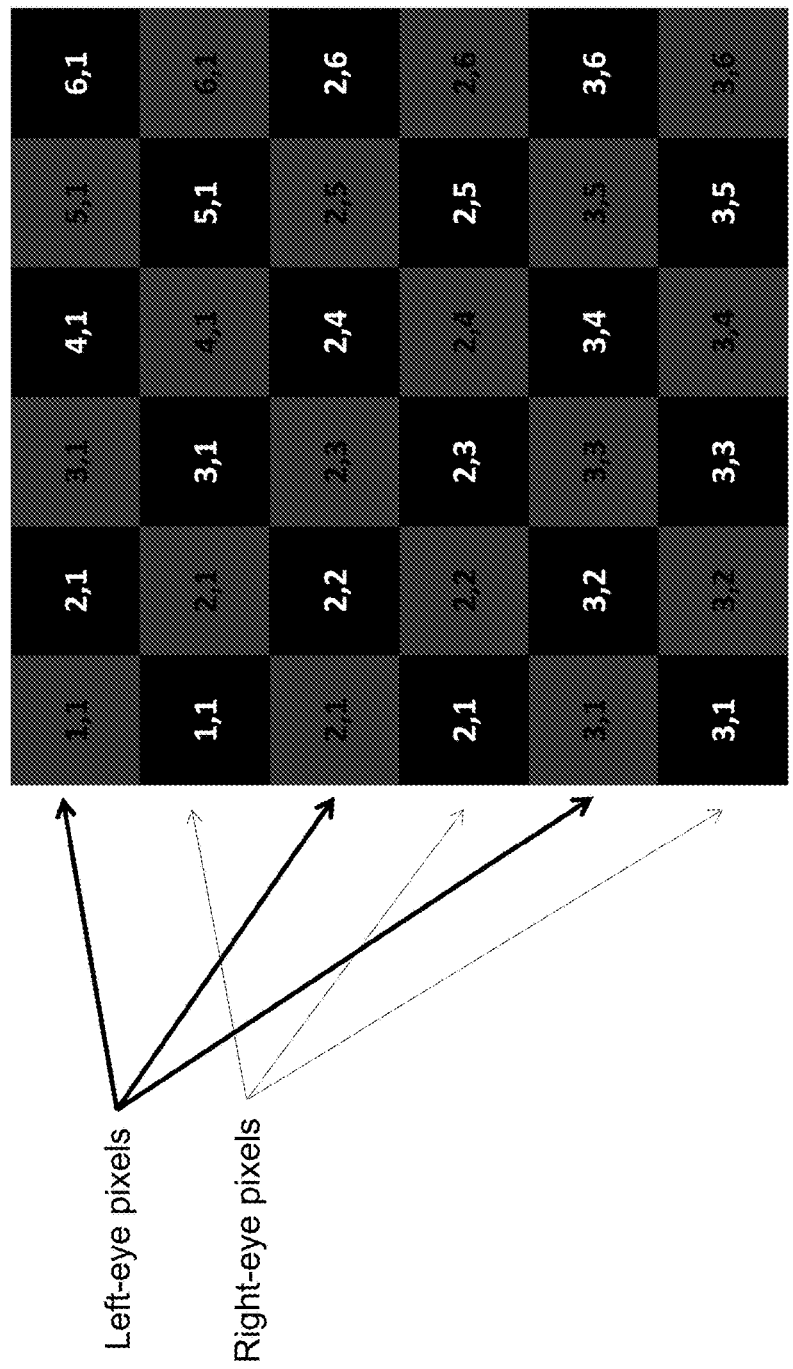
FIG. 7 is a schematic diagram illustrating a view from one eye of an example checkerboard FPR display.

For large light emitting diode (LED) displays the geometry may be much different. The emitting area of the individual diode chips may be relatively small compared to the actual pixel size. Additionally, in a cinema environment, the pixels may be physically large compared to the thickness of the retarder films as illustrated in FIG. 6. Therefore it may be possible to more easily prevent parallax cross-talk, making it possible to replace the stripe pattern with a much more visually acceptable checkerboard pattern as illustrated in FIG. 7. FIG. 7 illustrates the view from one eye of an example checkerboard FPR display, where half of the pixels are turned off.

For 4 k cinema image display (4096 horizontal pixels by 2160 vertical pixels), content may be mastered with the assumption that the pixels are square and that they are arranged into a regular rectangular grid. The checkerboard patterning of pixels for 3D display presents a challenge: the pixels in the checkerboard array may be on a diagonal square grid (with diagonal borders). Therefore the indexing of the data pixels onto the physical pixels may not be trivial. If the minimum number of pixels is chosen (4096×2160×2 eyes=17.7M pixels), then the data must be re-sampled from the rectangular grid onto the checkerboard grid. This must be done very carefully and has a large potential for introducing aliasing artifacts. If excess display pixels are used, then the mapping from the data to the display may become more stable and therefore easier, but this comes with a direct cost of additional pixels as well as both processing time and electronics.

For purposes of discussion, this disclosure defines a 3D image pixel as the pair of left-eye and right-eye image subpixels. For rectangular grids, a 3D image pixel can be referenced by two indexes (i, j) that reference the pixel number in the horizontal and vertical directions. An additional index e=l/r indicates whether a left or right eye is being addressed. For completeness, a third index c=r/g/b can be added to indicate which color is being addressed.

Figure 8:
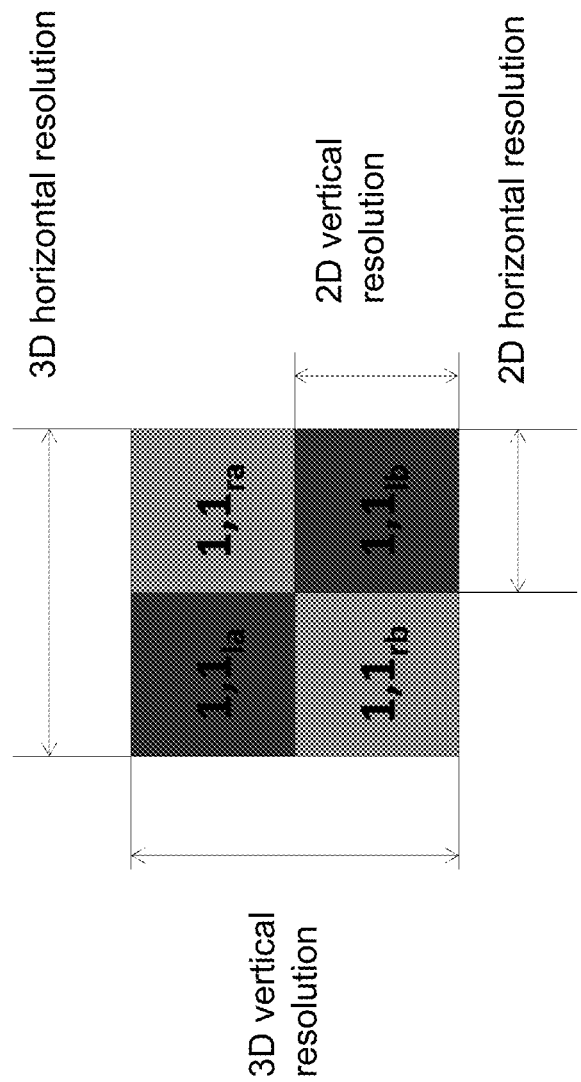
FIG. 8 is a schematic diagram illustrating an example subdivided pixel.

A rectangular pixel grid can be recovered if a single 3D image pixel $P_{ij}$ is constructed as shown in FIG. 8. In this configuration, each eye subpixel consists of two separate pixels which are driven to the same brightness values. In 2D there are several options available. All four subpixels can be driven identically to produce a display two times as bright as the 3D version (neglecting polarization losses). Alternatively the four subpixels can be driven at one-half of the original power to produce an image with the same brightness as the 3D image (again neglecting polarization losses). A third possibility is to drive the four subpixels independently to produce a 2D image at twice the resolution as the 3D image (in both the vertical and horizontal directions). In 3D mode, it is also possible to drive the subpixels independently to produce an image with a resolution $2^{1/2}$ times higher than the mode in which the subpixels are driven together. To make best use of this mode, the original content may be mastered with this display geometry in mind (most easily on this actual display). A drawback to this solution may be that it uses two times as many pixels as are necessary and thus increases the cost.

Figures 9A, 9B:
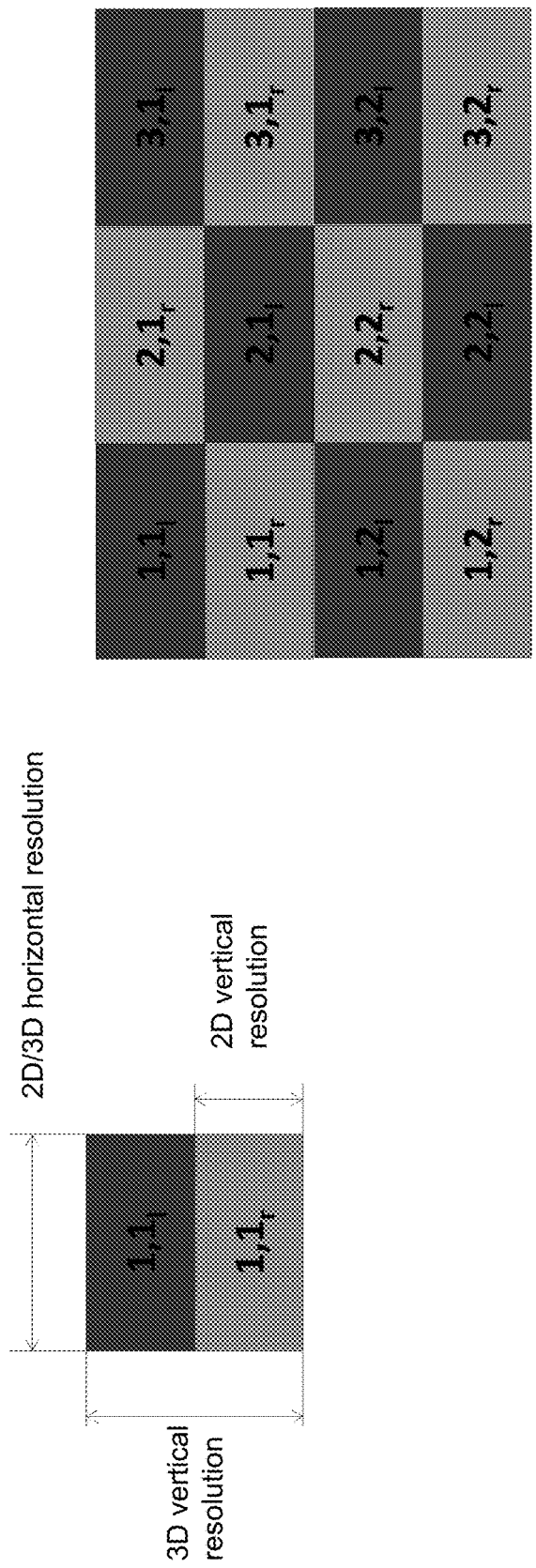
FIG. 9A is a schematic diagram illustrating an example subdivided pixel with a 2:1 aspect ratio.
FIG. 9B is a schematic diagram illustrating tiling of example subdivided pixels with a 2:1 aspect ratio.

A solution that utilizes the minimum number of pixels may be advantageous. An embodiment is shown in FIG. 9A. In this diagram, the usual square pixels have been replaced by rectangular pixels with an aspect ratio of 2:1. A single 3D image pixel $P_{ij}$ consists of a left-right pair of pixels. In FIG. 9A, the left-right pair has been drawn with the long axis horizontal; however, a vertical orientation may be equally useful. In adjacent pairs of pixels, the relative positions of the left eye subpixel and the right eye subpixel is reversed as illustrated in the tiling shown in FIG. 9B. This may eliminate the objectionable continuous lines seen in FIG. 5. In 2D mode when all of the pixels are visible, the left and right subpixels can be driven identically so that the 2D image has the same resolution as the 3D image. Alternatively, the pixels can be driven separately in which case the display has twice the resolution in 2D in only one axis (in this example the vertical direction).

Figure 10:
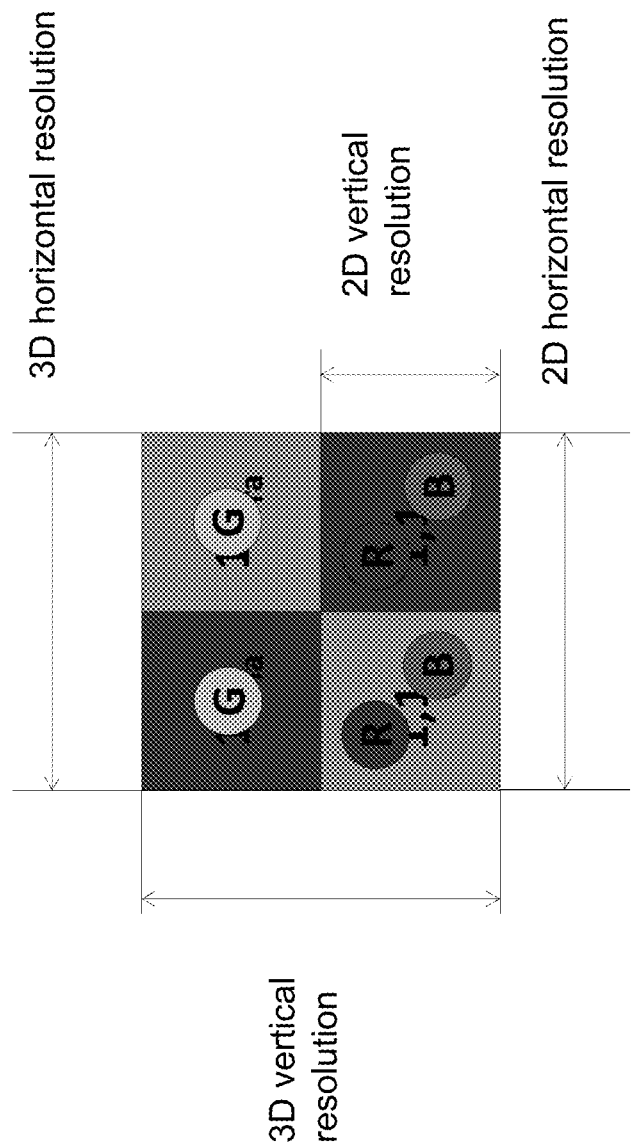
FIG. 10 is a schematic diagram illustrating an example subdivided pixel with color separation.

Another embodiment is illustrated in FIG. 10. In this diagram, a 3D image pixel as shown in FIG. 8 is further sub-divided to separate the green emitter from the red and blue emitters. Because the red and blue colors contain significantly less luminance than the green, this grouping combines the red and blue contributions in order to attempt to balance the green. Luminance may be spread out within the 3D image pixel to minimize the visibility of the dark region. The resolution of the 2D image may be twice that of the 3D image (in one axis).

Figure 11:
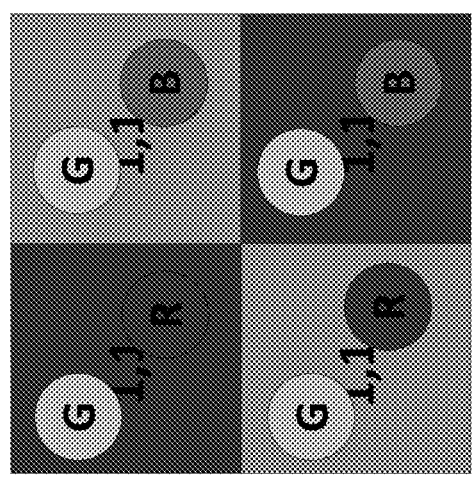
FIG. 11 is a schematic diagram illustrating an example subdivided pixel with an additional green emitter added to each subpixel.

Another embodiment is illustrated in FIG. 11. In this diagram, a 3D image pixel as shown in FIG. 8 is further sub-divided. In order to better balance the luminance between regions of the subpixel, it may be advantageous to add an additional green emitter to each subpixel. In this diagram, one part of the left eye subpixel is green and red (yellow) and the other part of the subpixel is green and blue (cyan). This configuration uses 33% more pixels than the minimum pixel configuration. It may be difficult to define the resolution of these configurations.

Figure 12:
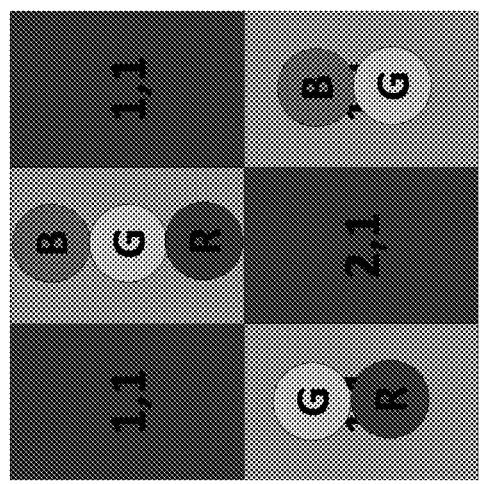
FIG. 12 is a schematic diagram illustrating an example subdivided pixel with the subpixels split into three regions.
Figure 13B:
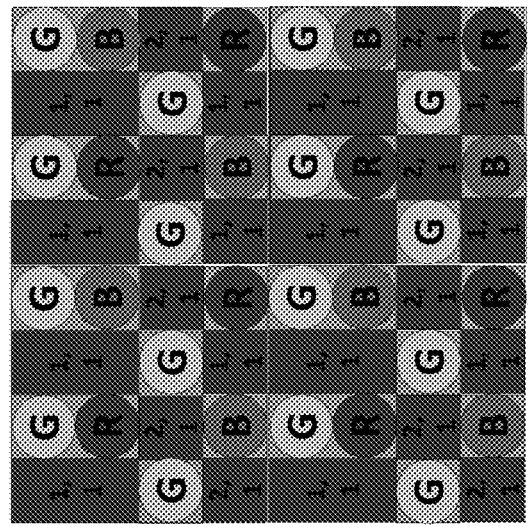
FIG. 13B is a schematic diagram illustrating tiling of example subdivided pixels with red and blue emitters separated in the subpixels.
Figure 13A:
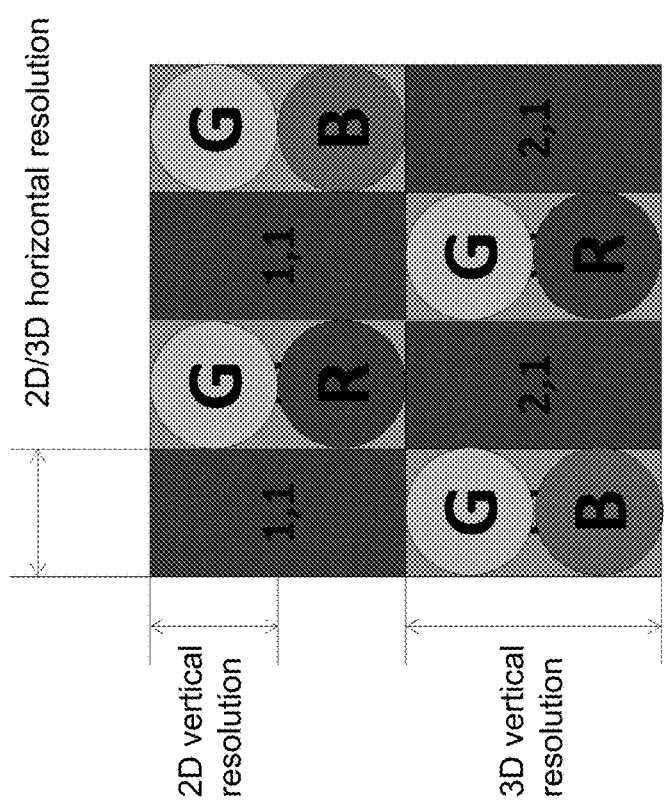
FIG. 13A is a schematic diagram illustrating an example subdivided pixel with red and blue emitters separated in the subpixels.

If denser packing of pixels is necessary (for viewers very close to the screen), additional embodiments are available. FIG. 12 shows an embodiment that requires 133% more pixels than the minimum. In this configuration, the subpixels may be split into three regions. One region contains emitters for all three colors whereas the other two regions each contain either a blue or red emitter plus a green emitter. Note that the aspect ratio of the subpixel regions is 3:2 for this configuration. The pixel can be subdivided further as shown in FIG. 13A, which is a configuration that uses 166% more pixels than the minimum. In this diagram, it may be advantageous to separate the red and blue emitters and rearrange them on a global scale as shown in FIG. 13B.

Another embodiment may combine the drive electronics for identical color emitters within a subpixel. For example, in FIG. 11, the extra green emitter can be driven by the same electronics as the first green emitter. This may simplify the electronics of the assembly and can help to reduce cost.

As may be used herein, the terms "substantially" and "approximately" provide an industry-accepted tolerance for its corresponding term and/or relativity between items. Such an industry-accepted tolerance ranges from zero to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A 3D image pixel in a spatially multiplexed stereo 3D display for displaying a 3D image, the 3D image including a left-eye image and a right-eye image, the 3D image pixel comprising:
 a first left-eye subpixel, the first left-eye subpixel driven when displaying the left-eye image, the first left-eye subpixel having a square shape;
 a second left-eye subpixel, the second left-eye subpixel driven when displaying the left-eye image, the second left-eye subpixel having the square shape;
 a first right-eye subpixel adjacent to the first left-eye subpixel and also adjacent to the second left-eye subpixel, the first right-eye subpixel driven when displaying the right-eye image, the first right-eye subpixel having the square shape; and
 a second right-eye subpixel adjacent to the first left-eye subpixel and also adjacent to the second left-eye subpixel, the second right-eye subpixel driven when displaying the right-eye image, the second right-eye subpixel having the square shape, wherein the first left-eye subpixel and the first right-eye subpixel emit only green color, and wherein the second left-eye subpixel and the second right-eye subpixel emit only red and blue colors.

2. The 3D image pixel of claim 1, wherein the first right-eye subpixel is horizontally adjacent to the first left-eye subpixel, and wherein the first right-eye subpixel is vertically adjacent to the second left-eye subpixel.

3. A 3D image pixel in a spatially multiplexed stereo 3D display for displaying a 3D image, the 3D image including a left-eye image and a right-eye image, the 3D image pixel comprising:
 a first left-eye subpixel, the first left-eye subpixel driven when displaying the left-eye image, the first left-eye subpixel having a square shape;
 a second left-eye subpixel, the second left-eye subpixel driven when displaying the left-eye image, the second left-eye subpixel having the square shape;
 a first right-eye subpixel adjacent to the first left-eye subpixel and also adjacent to the second left-eye subpixel, the first right-eye subpixel driven when displaying the right-eye image, the first right-eye subpixel having the square shape; and
 a second right-eye subpixel adjacent to the first left-eye subpixel and also adjacent to the second left-eye subpixel, the second right-eye subpixel driven when displaying the right-eye image, the second right-eye subpixel having the square shape, wherein the first left-eye subpixel and the second right-eye subpixel emit only green and red colors, and wherein the second left-eye subpixel and the first right-eye subpixel emit only green and blue colors.

4. A spatially multiplexed stereo 3D display for displaying a 3D image, the 3D image including a left-eye image and a right-eye image, the spatially multiplexed stereo 3D display comprising:
 a plurality of the 3D image pixels of claim 1.

5. A 3D image pixel in a spatially multiplexed stereo 3D display for displaying a 3D image, the 3D image including a left-eye image and a right-eye image, the 3D image pixel comprising:
 a left-eye pixel, the left-eye pixel driven when displaying the left-eye image, the left-eye pixel having a rectangular shape; and
 a right-eye pixel adjacent to the left-eye pixel, the right-eye pixel driven when displaying the right-eye image, the right-eye pixel having the rectangular shape, wherein the left-eye pixel has a vertical measurement and a horizontal measurement, and wherein the horizontal measurement is greater than the vertical measurement.

6. The 3D image pixel of claim 5, wherein the right-eye pixel is horizontally adjacent to the left-eye pixel.

7. The 3D image pixel of claim 5, wherein the right-eye pixel is vertically adjacent to the left-eye pixel.

8. The 3D image pixel of claim 5, wherein the horizontal measurement and the vertical measurement create an aspect ratio of 2:1.

9. A spatially multiplexed stereo 3D display for displaying a 3D image, the 3D image including a left-eye image and a right-eye image, the spatially multiplexed stereo 3D display comprising:
 a plurality of the 3D image pixels of claim 5.

10. The spatially multiplexed stereo 3D display of claim 9, wherein a first 3D image pixel is horizontally adjacent to a second 3D image pixel, wherein the right-eye pixel of the first 3D image pixel is vertically adjacent to and below the left-eye pixel of the first 3D image pixel, and wherein the right-eye pixel of the second 3D image pixel is vertically adjacent to and above the left-eye pixel of the second 3D image pixel.

11. The spatially multiplexed stereo 3D display of claim 10, wherein the first 3D image pixel is vertically adjacent to a third 3D image pixel, and wherein the right-eye pixel of the third 3D image pixel is vertically adjacent to and below the left-eye pixel of the third 3D image pixel.

12. A 3D image pixel in a spatially multiplexed stereo 3D display for displaying a 3D image, the 3D image including a left-eye image and a right-eye image, the 3D image pixel comprising:
 a first left-eye subpixel, the first left-eye subpixel driven when displaying the left-eye image;
 a second left-eye subpixel, the second left-eye subpixel driven when displaying the left-eye image;
 a third left-eye subpixel, the third left-eye subpixel driven when displaying the left-eye image;
 a first right-eye subpixel, the first right-eye subpixel driven when displaying the right-eye image;
 a second right-eye subpixel, the second right-eye subpixel driven when displaying the right-eye image; and
 a third right-eye subpixel, the third right-eye subpixel driven when displaying the right-eye image, wherein the first left-eye subpixel and the first right-eye subpixel emit red, green, and blue colors, wherein the second left-eye subpixel and the second right-eye subpixel emit only red and green colors, and wherein the third left-eye subpixel and the third right-eye subpixel emit only blue and green colors.

13. The 3D image pixel of claim 12, wherein the first left-eye subpixel includes a first green emitter driven by first electronics, wherein the second left-eye subpixel includes a second green emitter driven by the first electronics, and wherein the third left-eye subpixel includes a third green emitter driven by the first electronics.

14. The 3D image pixel of claim 3, wherein the first left-eye subpixel includes a first green emitter driven by first electronics, and wherein the second left-eye subpixel includes a second green emitter driven by the first electronics.

15. The 3D image pixel of claim 3, wherein the first right-eye subpixel is horizontally adjacent to the first left-eye subpixel, and wherein the first right-eye subpixel is vertically adjacent to the second left-eye subpixel.

16. A spatially multiplexed stereo 3D display for displaying a 3D image, the 3D image including a left-eye image and a right-eye image, the spatially multiplexed stereo 3D display comprising:
 a plurality of the 3D image pixels of claim 3.

* * * * *